United States Patent

[11] 3,597,983

| [72] | Inventor | Gunter J. Schwarzschild<br>Stamford, Conn. |
|------|----------|---------------------------------------------|
| [21] | Appl. No. | 801,696 |
| [22] | Filed | Feb. 24, 1969 |
| [45] | Patented | Aug. 10, 1971 |
| [73] | Assignee | The United States Time Corporation<br>Waterbury, Conn. |

[54] GYROSCOPE DAMPING MECHANISM
4 Claims, 4 Drawing Figs.

[52] U.S. Cl.................................................. 74/5.5,
73/430
[51] Int. Cl............................................. G01c 19/04,
G01d 11/14
[50] Field of Search........................................ 74/5.5, 5;
73/430

[56] References Cited
UNITED STATES PATENTS

| 3,236,108 | 2/1966 | Zatsky et al. | 73/430 X |
| 3,240,075 | 3/1966 | Ranes | 73/430 X |
| 2,834,213 | 5/1958 | Fredericks | 74/5.5 |
| 2,864,256 | 12/1958 | Haagens et al. | 74/5.5 |
| 2,955,472 | 10/1960 | Krupick et al. | 74/5.5 |
| 3,222,936 | 12/1965 | Talbot et al. | 74/5.5 |
| 3,241,376 | 3/1966 | Poquette, Jr. | 74/5.5 |
| 3,352,163 | 11/1967 | Boothroyd et al. | 74/5.5 |

*Primary Examiner*—Manuel A. Antonakas
*Attorney*—Davis, Hoxie, Faithfull & Hapgood ABSTRACT: A gyroscope includes a motor-driven rotor mounted on a rotatable gimbal. The gimbal has paddles which pump a fluid through controlled orifices for damping of the gimbal. A temperature-responsive bellows is connected to a plurality of valve plungers which move within the orifices to control their effective size.

INVENTOR.
Gunter J. Schwarzschild

Patented Aug. 10, 1971

INVENTOR.
Gunter J. Schwarzschild
BY
Davis, Hoxie, Faithfull & Hapgood
ATTORNEYS.

GYROSCOPE DAMPING MECHANISM

DESCRIPTION

The present invention related to gyroscopes and more particularly to a damping mechanism in a fluid-damped gyroscope.

Gyroscopes are employed as the guidance means for airplanes and rockets. The increased technical sophistication of such guidance systems, and particularly their use in small rockets, has created a demand for gyroscopes which are relatively lighter in weight and smaller in size.

It has been difficult to obtain savings in weight and size because the motor, gimbal and pickoff arrangement require a certain size. In addition, many gyroscopes utilize a fluid within the case and surrounding at least part of the gimbal to dampen the movement of the gimbal. Such damping prevents the gimbal from oscillating due to the vibration of its vehicle and enables the gimbal movement to be smooth and linear in relation to the force causing such movement. The fluid, due to the wide variation in temperature to which the gyroscope may be subjected, may expand or contract. An expandable and collapsible bellows may be provided to compensate for the difference in volume of the fluid due to temperature variations. The damping of the gimbal may be obtained, primarily, by having the fluid pumped through a controlled opening. A paddle, vane or blade, or other surface on the gimbal structure in a first chamber, pushes the fluid against a fixed wall structure (fixed paddle), causing the fluid to be propelled through an opening into a second chamber. Various valve and channel structures have been proposed for the damping device; however, generally they add to the size of the gyroscope and particularly add to its length in the direction of the axis of the gimbal.

It is the objective of the present invention to provide a gyroscope having a temperature-compensated fluid damping mechanism which is (1) reliable and rugged, (2) adds relatively little to the size and weight of the gyroscope, and (3) provides a relatively constant damping over a range of temperature variations.

In accordance with the present invention, a set of moving paddles is attached to, or integral with, the gimbal structure of a gyroscope. The case has fixed to it an opposite set of fixed members (fixed paddles). The moving paddles and fixed paddles form, between them, a set of fluid-filled pumping chambers. Each pumping chamber has an exit port and an entry port, the ports communicating with a fluid-filled reserve chamber containing a bellows. A set of elongated plungers (valves), with one of their ends fixed to the bellows, operate in each exit port. The surface of each of the pistons is selectively shaped to provide each of the exit ports with a varying controlled opening, which opening depends upon the distance the bellows advances or retracts the plunger in the exit port. The varying exit openings compensate for variations in the viscosity of the fluid caused by temperature changes. Preferably the ports are formed in a single plate, a portion of the plate acting as a fixed wall in each of the fluid-filled pumping chambers.

The gyroscope construction of the present invention avoids the use of fluid channels between the pumping chambers and the reserve chamber, thereby decreasing the complexity of the damping mechanism and shortening the length of the gyroscope along the axis of the gimbal.

Other objectives of the present invention will be apparent from the following detailed description of the inventor's best mode of practicing the invention, the description being taken in conjunction with the accompanying drawing, in which.

The damping mechanism of the present invention is described below in connection with an integrating gyroscope. However, the damping mechanism is also applicable to other instruments which utilize temperature-compensated fluid damping, such instruments including some types of accelerometers and rate gyroscopes.

Figure 1:
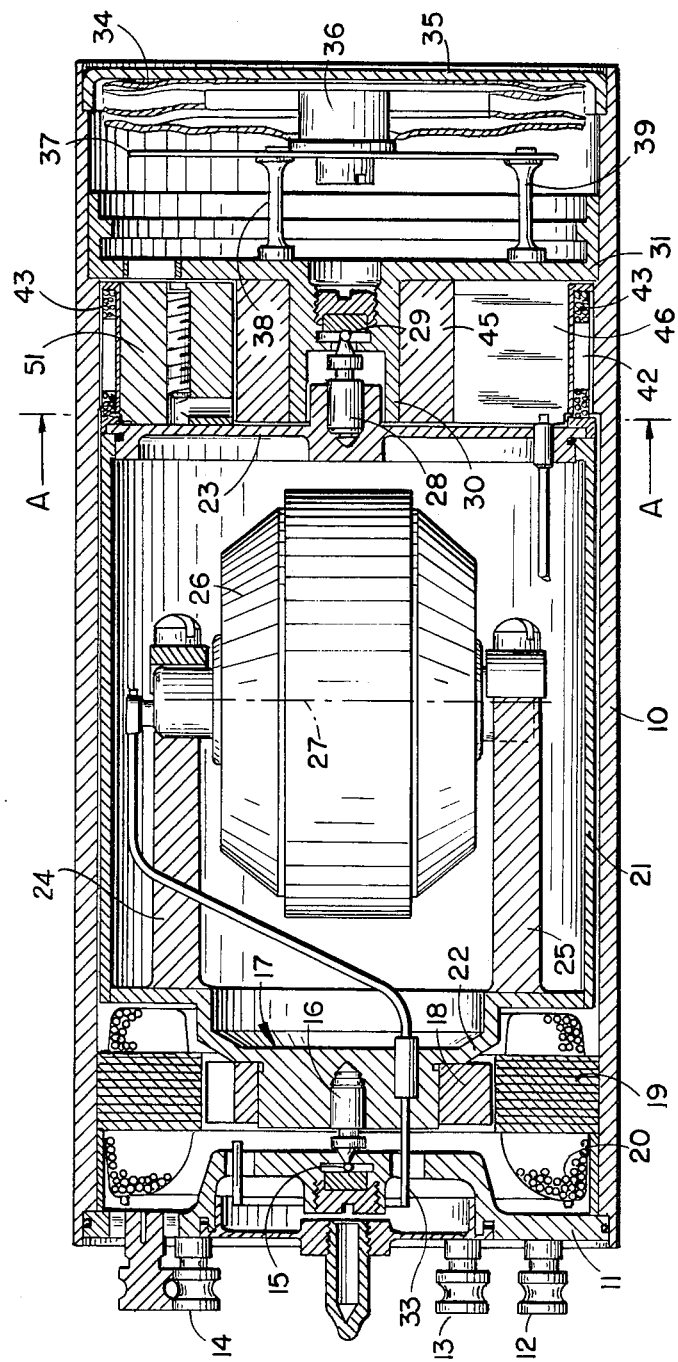
FIG. 1 is a side sectional view of the gyroscope of the present invention, showing the bellows extended.
Figure 2:
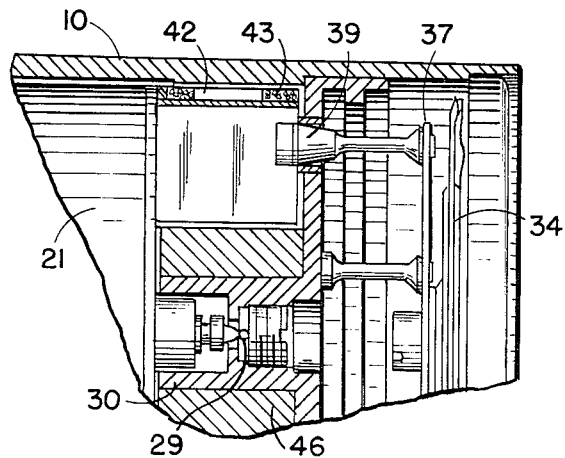
FIG. 2 is an enlarged side sectional view of a portion of the damping mechanism showing the bellows withdrawn.
Figure 3:
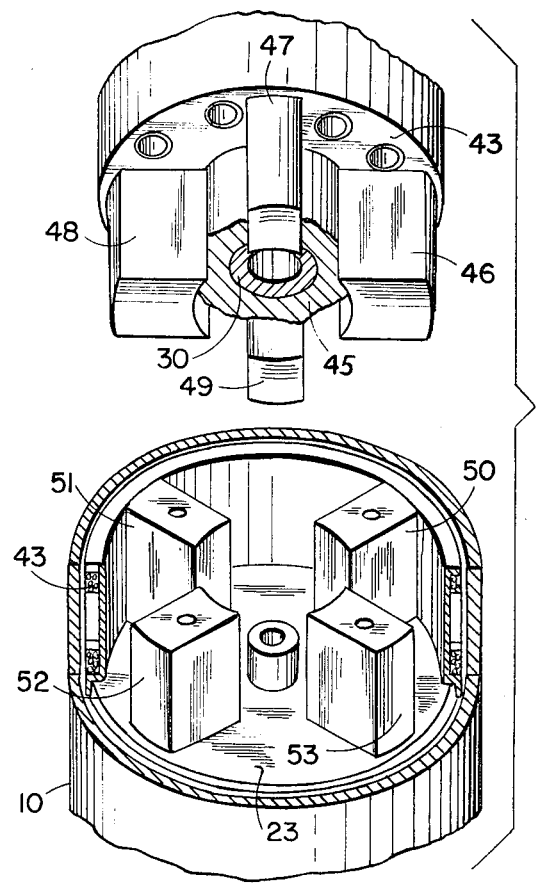
FIG. 3 is an exploded perspective view of the damping mechanism with the torque coil enclosure in sectional view.

The integrating gyroscope of FIG. 1 includes cylindrical casing 10 within which the gyroscope is positioned. A closure member 11, having electrical terminals 12, 13 and 14, closes one end casing 10. A bearing 15 is rotatably mounted in closure member 11. A rod 16, whose ball-like end is the bearing member, supports one end of the gimbal 17. A magnetic member 18, mounted on gimbal 17, is the moving member of the microsyn pickoff. The fixed members of the pickoff include the laminated plate member 19, fixed relative to casing 10, and a plurality of coils 20 whose leads are connected to the terminals.

The gimbal 17 consists of a cylindrical tubular shell 21 and, connected thereto, end plates 22 and 23. The gimbal is filled with an inert gas, such as helium, and floats on a damping fluid, such as a silicone oil. First 24 and second 25 inward protruding support members are attached to plate 22. A small rotating electric motor 26 is mounted at its one end on support member 24 and at its other end mounted to support member 25. The axis of rotation of motor 26 is about line 27. The plate 23 has a rod 28 supporting it, whose end is a ball-like bearing 29. The bearing 29 is held in a cylindrical portion 30 of a damping plate 31. The damping plate 31 is fixed within case 10. A rigid tube 32, having an internal wire, connects motor 28 to a flexible lead 33.

The damping mechanism includes a bellows 34, which may be spring loaded. The bellows, at its fixed back end, is attached to end closure plate 35, which plate 35 is fixed to case 10. The bellows 34 has a central member 36 at the center of its expandable end. The central member 36 carries a plate 37. Eight elongated valve plungers (only two of which, 38 and 39, shown in FIG. 1) are fastened at their rear end to plate 37.

The gimbal plate 23 carries a thin cylindrical wall coil container 42 which fits in the gap between case 10 and a magnet structure. The container 42 has within it a set of coils 43 which are used for applying torque to the gimbal.

Figure 4:
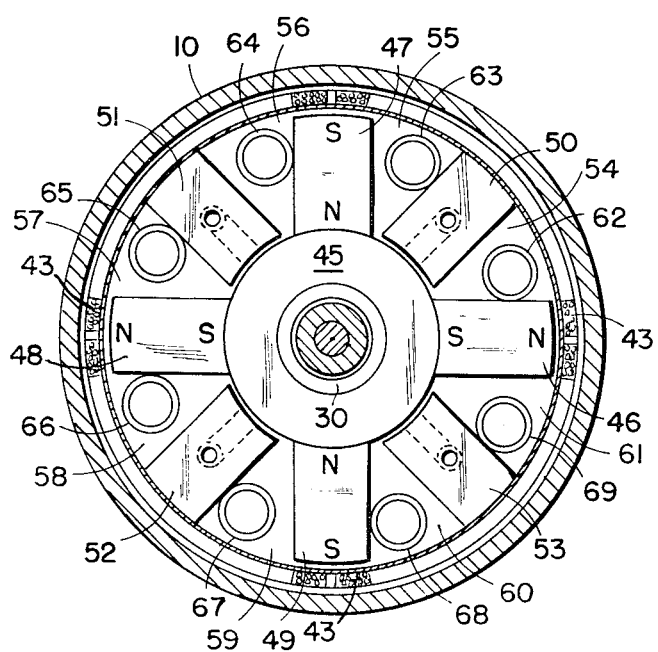
FIG. 4 is a sectional end view taken along line A-A of FIG. 1, but extended to show a complete cross section of the gyroscope.

As shown in FIG. 4, the magnet structure cooperates with the torque coils 43, the coils being connected in series. The magnet structure includes a cylindrical shunt member 45 of iron, and four radially extending arm members 46—49 which are fixed paddles of the fluid pumping system. The fixed paddles are magnets, for example, an alnico alloy or a ceramic ferrite, which are poled alternatively as to field and radially, with regard to the center of shunt 45, as to orientation. The fixed paddles perform two functions: (1) they create magnetic fields for the torque coils, and (2) they act as fixed paddles (fixed walls) for pumping damping fluid. The moving paddles (vanes) 50—53 are fixed to the gimbal and rotate with it. The moving paddles and fixed paddles form two walls in each of the eight pumping chambers 54—61. The gimbal plate 23 and damping plate 30 form the other containing walls of those pumping chambers.

Each of the pumping chambers 54—61 has an exit port (orifice) 62—69 within which a shaped elongated valve plunger moves. Each of the ports 62—69 is fixed in size; however, the extent to which it is opened, i.e., the space between its plunger and the wall of the port, is determined by the contour of the plunger and the length it is inserted through the port.

In operation, upon a rise in temperature, the fluid becomes thinner and the bellows contracts. The plungers are withdrawn partially and their contours are shaped to effectively decrease the size of the ports. More pressure is consequently required to pump fluid through the effectively smaller ports so that the effect of the thinner fluid is counteracted and the effective damping remains constant.

I claim:

1. A gyroscope including a case, a gimbal rotatably mounted within said case, a rotor rotatably mounted within said gimbal, a plurality of movable paddles fixed on said gimbal, a fluid reserve chamber filled with fluid within said case, a plurality of fixed magnets attached to said case and forming fixed paddles of fluid pumping chambers, said magnets creating magnetic fields, a torque coil fixed to said gimbal for interaction with the magnetic fields to apply torque to the gimbal, a closure means for said pumping chambers fixed to said case and having a port in each chamber communicating with said reserve chamber, a temperature responsive means which moves under temperature variations, a plurality of elongated plungers connected with said temperature responsive means with one plunger acting as a valve in each of the said ports.

2. A gyroscope as in claim 1 wherein the temperature-responsive means is a bellows.

3. A gyroscope as in claim 1 wherein the torque coil is positioned in a thin cylindrical enclosure which fits in the gap between the outer end of the magnets and the case and the inner ends of the magnets are connected to a central shunt.

4. A measuring instrument including a case, a movable member within said case having connected thereto a plurality of moving paddles, damping fluid within said case, means to suspend said movable member, a damping plate fixed to said case and having a plurality of ports, a plurality of fixed paddles attached to said case, said paddles each comprising a magnet, the moving paddles and fixed paddles and damping plate forming a plurality of chambers changeable in size by motion of the moving paddles and being filled with a damping fluid, a fluid reserve chamber in said case, said ports in said damping plate communicating with the reserve chamber, temperature variation, a plurality of plungers with a with a plunger within each port connected to said temperature-responsive means, and a torque coil fixed to the movable member which is adapted to move in the fields of the magnets.